United States Patent [19]

Miller et al.

[11] Patent Number: 5,706,123
[45] Date of Patent: Jan. 6, 1998

US005706123A

[54] SWITCHED CONTROL SIGNALS FOR DIGITAL MICRO-MIRROR DEVICE WITH SPLIT RESET

[75] Inventors: Rodney D. Miller, Frisco; Richard O. Gale, Richardson; Henry Chung-Hsin Chu, Plano; Harlan Paul Cleveland, Garland; Rabah Mezenner, Richardson, all of Tex.

[73] Assignee: Texas Instruments Incorporated, Dallas, Tex.

[21] Appl. No.: 720,367

[22] Filed: Sep. 27, 1996

[51] Int. Cl.⁶ ............................................. G02B 26/00
[52] U.S. Cl. ..................... 359/291; 359/293; 359/294; 359/230; 359/212; 359/221
[58] Field of Search ............................ 359/291, 292, 359/293, 296, 290, 212, 221, 230, 294

[56] References Cited

U.S. PATENT DOCUMENTS 4,662,746  5/1987  Hornbeck ............................ 350/269
4,755,013  7/1988  Setani ................................... 350/6.6
4,859,012  8/1989  Cohn .................................. 350/96.24
5,096,279  3/1992  Hornbeck et al. .

*Primary Examiner*—Frank G. Font
*Assistant Examiner*—Reginald A. Ratlift
*Attorney, Agent, or Firm*—Julie L. Reed; James C. Kesterson; Richard L. Donaldson

[57] ABSTRACT

A method of providing control signals for resetting mirror elements (10,20) of a digital micro-mirror device (DMD) having reset groups (FIG. 4), or for resetting moveable elements of other micro-mechanical devices that operate with similar principles. A bias voltage is applied to the mirrors and their landing sites, and an address voltage is applied under the mirrors. (FIG. 3). The address voltage is held at an intermediate level except during a reset period. During this reset period, the address voltage is increased. Also, during reset, the bias applied to mirrors to be reset is pulsed and offset, and the bias applied to mirrors not to be reset is increased. (FIGS. 5 and 6).

19 Claims, 3 Drawing Sheets

5,706,123

SWITCHED CONTROL SIGNALS FOR DIGITAL MICRO-MIRROR DEVICE WITH SPLIT RESET

TECHNICAL FIELD OF THE INVENTION

This invention relates to micro-mechanical devices, and more particularly, to a method for controlling the movable elements of such devices.

BACKGROUND OF THE INVENTION

A recent development in the field of electromechanics has been the miniaturization of various mechanical devices. Typical of such devices are tiny gears, levers, and valves. These "micro-mechanical" devices are manufactured using integrated circuit techniques, often together with electrical control circuitry. Common applications include accelerometers, pressure sensors, and actuators. As another example, spatial light modulators can be configured from micro-mechanical reflective mirror elements.

One type of micro-mechanical device is a digital micro-mirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each mirror is attached to one or more torsion hinges. The mirrors are spaced by means of air gaps, over underlying control circuitry. The control circuitry provides electrostatic forces, which cause each mirror to selectively tilt.

For optimal operation of a DMD, each mirror should promptly tilt to a new "on" or "off" position when desired. For a given sticking force at the landing surface, it is possible to define a hinge restoration force that will free the mirrors from a landed state. However, due to other system considerations, such as the desire to operate the DMD at relatively low voltages and to have self-latching mirrors, it may not be desired to increase the hinge stiffness to a point where all mirrors will reset automatically upon removal of the address signal.

Thus, to encourage the mirrors to reset independently of the address voltages, a bias signal with an extra reset voltage has been applied to the mirrors. U.S. Pat. No. 5,096,279, entitled "Spatial Light Modulator and Method", to Hornbeck and assigned to Texas Instruments Incorporated, describes the use of a reset pulse signal. In the past, both single pulse signals and multiple pulse signals have been tried. Neither has had entirely satisfactory results.

The control signals, address and bias, must be timed and their voltage levels adjusted to meet a number of goals. One goal is to minimize the voltage required to keep the mirrors in a latched state when not being switched. However, the voltage must be sufficient to ensure a reliable mirror transition during switching. The timing of the control signals must ensure that the mirrors quickly settle to a new state after switching.

SUMMARY OF THE INVENTION

One aspect of the invention is a method of resetting the mirror elements of a digital micro-mirror device (DMD). More generally, the invention is a method of controlling the movable elements of any micro-mechanical device, where each movable element is attracted toward a landing surface in response to electrostatic forces, and where the moveable elements are grouped into reset groups. A bias voltage is applied to the movable elements, and an address voltage is applied under them. To reset the movable elements of one of the reset groups, the address voltage is switched in accordance with on or off positions of those movable elements. After this switching step, those moveable elements are reset by adding a reset voltage to their bias voltage and then reducing the bias voltage. During the resetting phase, the bias voltage of the other moveable elements is increased. Also, during the resetting phase, the high address voltage is increased for all the movable elements.

An advantage of the invention is that it provides a method for quickly and reliably switching movable elements of a micro-mechanical device. The advantages are particularly evident in a DMD having reset groups in which mirror elements share memory cells with mirror elements of other reset groups. In this case, when the mirror elements of one reset group are to be reset in response to an address switch, the mirror elements of the other reset groups should remain latched and be unaffected by the address switch. As a result of the invention, during the reset, for reset groups being reset, the higher address voltage increases the address margin. At the same time, for latched reset groups, the latching force is strengthened by increasing the bias voltage. Device lifetime and reset efficiency is increased by reducing overall operating voltages.

DETAILED DESCRIPTION OF THE INVENTION

For purpose of example, the following description is in terms of a particular type of micro-mechanical device, a "digital micro-mirror device" (DMD), sometimes also referred to as a "deformable mirror device". As described in the Background, a DMD is comprised of tiny hinged mirrors, each supported over a substrate of control circuitry. The invention is directed to DMDs having reset groups and provides an improved method of providing control signals for switching the mirrors from one position to another. However, the same concepts could apply to any micro-mechanical device having movable elements, that are arranged in reset groups and that move in response to electrostatic attraction.

One application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the "mirror" need not be reflective. Also, in some applications, the DMD is operated in an analog rather than a digital mode. In general, the term "DMD" is used herein to include any type of micro-mechanical device having at least one hinge-mounted deflectable element that is spaced by an air gap from a substrate, relative to which it moves.

Figure 1:
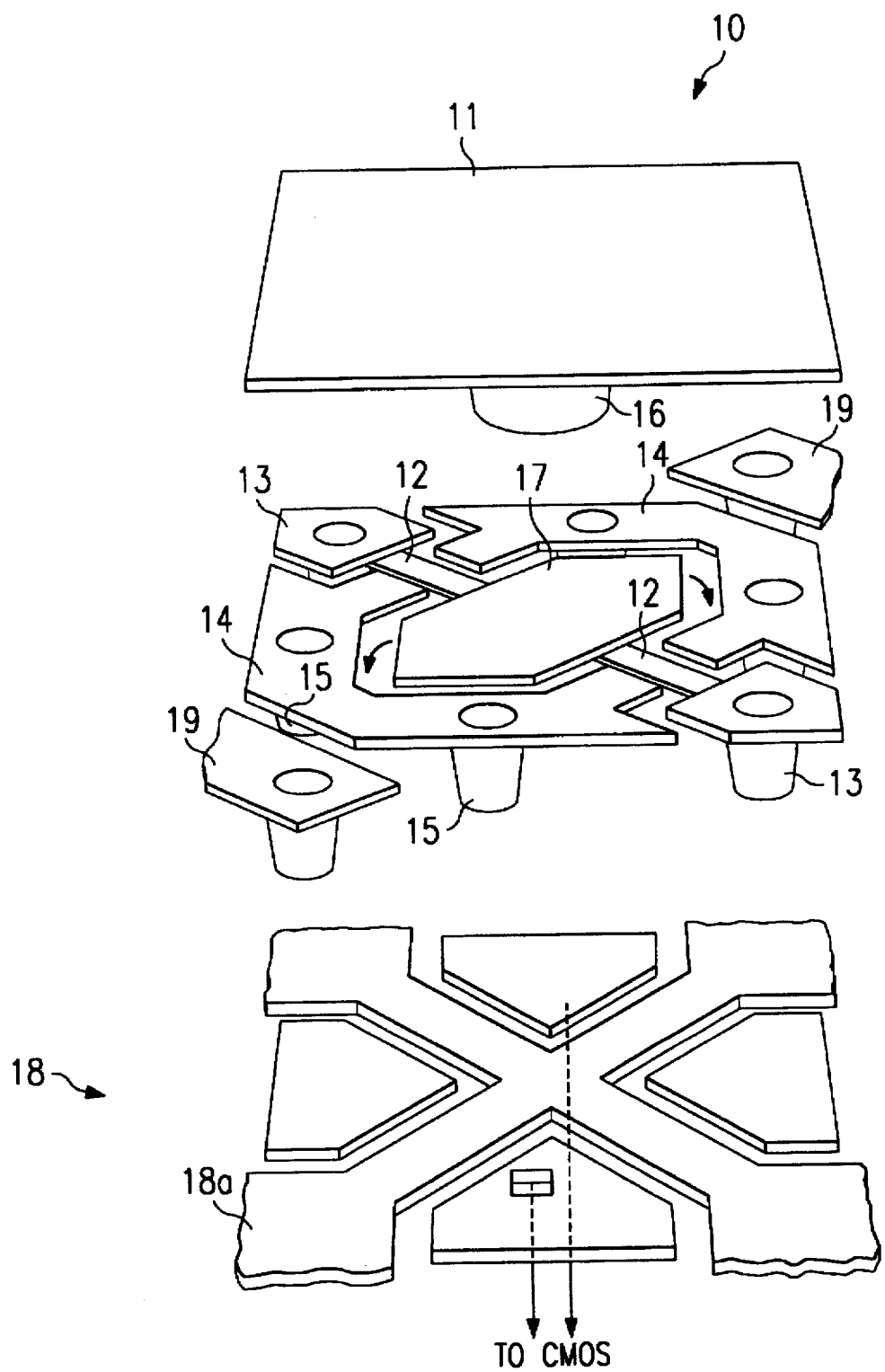
FIG. 1 is an exploded perspective view of a hidden hinge type mirror element of a digital micro-mirror device (DMD).

FIG. 1 is an exploded perspective view of a single mirror element 10 of a DMD. In FIG. 1, the mirror 11 is undeflected, but as indicated by the arrows, its torsion hinges 12 permit it to be deflected in either of two directions. As indicated above, various DMD applications may use such mirror elements 10 singly or in arrays.

The mirror element 10 of FIG. 1 is known as a "hidden hinge" mirror element. Other types of mirror elements 10 can be fabricated, including a "torsion beam" type, described below in connection with FIG. 2, where the mirror is mounted directly to the hinges instead of over a yoke to which the hinges are attached. Various DMD types are described in U.S. Pat. No. 4,662,746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-Level Deformable Mirror Device"; and U.S. patent Ser. No. 08/171,303, entitled "Improved Multi-Level Micro-Mirror Device". Each of these patents is assigned to Texas Instruments Incorporated and each is incorporated herein by reference.

As with other hidden hinge DMD designs, the hinges 12 of mirror element 10 are supported by hinge support posts 13, which are formed on a substrate 18. Address electrodes 14 are supported by address electrode support posts 15, which are on the same level as hinges 12 and hinge support posts 13. In variations of the hidden-hinge structure, there might be another set of address electrodes under yoke 17.

Mirror support post 16 is fabricated on a yoke 17. Yoke 17 is attached to one end of each of the two hinges 12. The other end of each hinge 12 is attached to a hinge support post 13. The hinge support posts 13 and the electrode support posts 15 support the hinge 12, address electrodes 14, and yoke 17 over a substrate 18 having a control bus 18a. When mirror 11 is tilted, the tip of mirror 11 contacts a landing site 19. In variations of the hidden-hinge structure, yoke 17 might contact a landing surface. The address electrodes 14 have appropriate electrical connections to memory cells (not shown), which are typically fabricated within substrate 18 using CMOS fabrication techniques.

Figure 2:
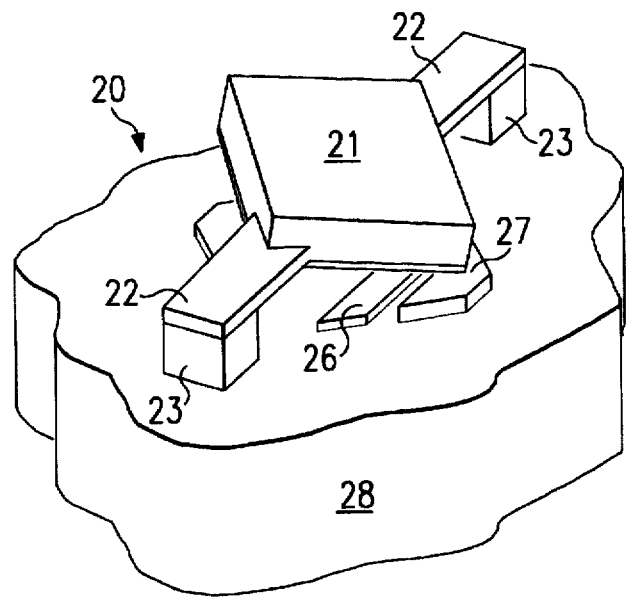
FIG. 2 is a perspective view of a torsion beam type mirror element of a DMD.

FIG. 2 illustrates a mirror element 20 of a torsion beam type DMD. The hinges 22 are not hidden, but rather extend from opposing sides of mirror 21. Hinges 22 are attached to hinge support posts 23. Address electrodes 26 provide attractive forces for tilting the mirror 21, which touches a landing pad 27. The mirror element 20 is fabricated over a substrate 28 of memory cells and control circuitry.

Many variations of the designs of FIGS. 1 and 2 are possible. For example, the yoke. 17 (or mirror 21) could be notched so that the hinges 12 (or 22) are set in. The hinges 12 (or 22) could be attached at a side of yoke 17 (or mirror 21) as in FIG. 1 or at a corner as in FIG. 2. Furthermore, the hinge attachment need not be at opposing corners or sides. The hinges could be attached so as to permit asymmetric tilting.

In operation for image display applications, and using an array of mirror elements 20 for example, a light source illuminates the surface of the DMD. A lens system may be used to shape the light to approximately the size of the array of mirror elements 20 and to direct this light toward them. Voltages based on data in the memory cells of substrate 28 are applied to the address electrodes 26. Electrostatic forces between the mirrors 21 and their address electrodes 26 are produced by selective application of voltages to the address electrodes 26. The electrostatic force causes each mirror 21 to tilt either about +10 degrees (on) or about −10 degrees (off), thereby modulating the light incident on the surface of the DMD. Light reflected from the "on" mirrors 21 is directed to an image plane, via display optics. Light from the "off" mirrors 21 is reflected away from the image plane. The resulting pattern forms an image. The proportion of time during each image frame that a mirror 21 is "on" determines shades of grey. Color can be added by means of a color wheel or by a three-DMD setup.

In effect, the mirror 21 and its address electrodes 26 form capacitors. When appropriate voltages are applied to mirror 21 and its address electrodes 26, a resulting electrostatic force (attracting or repelling) causes the mirror 21 to tilt toward the attracting address electrode 26 or away from the repelling address electrode 26. The mirror 21 tilts until its edge contacts landing pad 27. Once the electrostatic force between the address electrodes 26 and the mirror 21 is removed, the energy stored in the hinges 22 provides a restoring force to return the mirror 21 to an undeflected position. As explained below in connection with FIGS. 3–5, appropriate bias voltages maybe applied to the mirror 21 to aid in "unlatching" mirror 21 from its deflected position.

Figure 3:
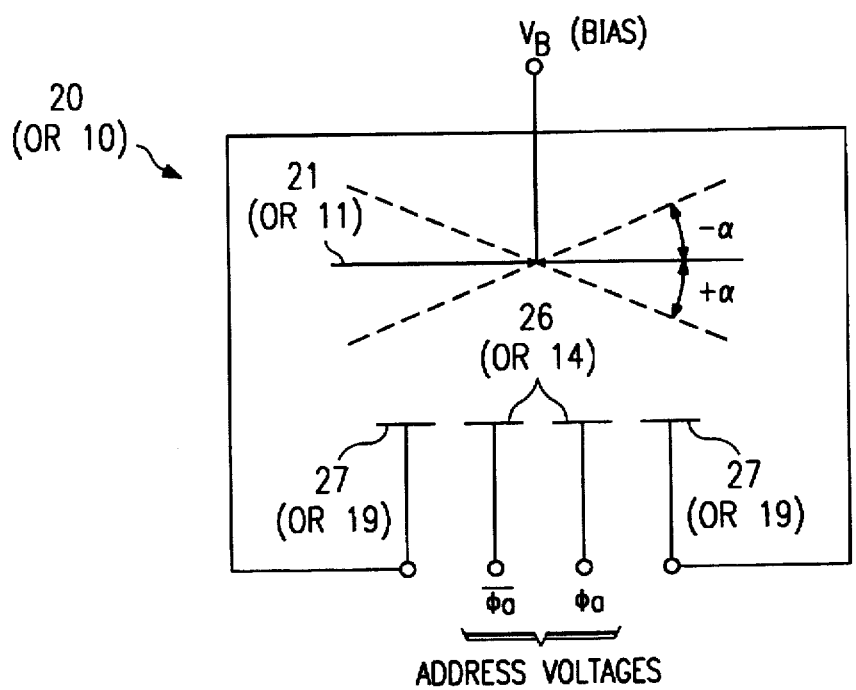
FIG. 3 is a schematic cross sectional view of portions of the mirror element of FIG. 1 or of FIG. 2.

FIG. 3 is a schematic cross sectional view of a portion of a torsion-beam mirror element 20 and its control voltages. A bias voltage is applied to the mirror 21. Because the mirrors land on a landing site 27, the bias is also applied here to prevent shorting. Depending on the state of its underlying memory cell, complementary address voltages, $\phi_a$ and $\bar{\phi}_a$, are switched back and forth and held while the data is displayed (the "bit period"). The mirror 21 is attracted by a combination of bias and address voltages toward one or the other of the address electrodes 26. It rotates until its tip touches the landing site 27. A typical tilt angle, $+\alpha$ or $-\alpha$, is 10 degrees. For a hidden-hinge mirror element 10, the control voltages are similar except that both the yoke 17 and the mirror 11 might have underlying address electrodes. Also, the bias voltage might be applied to the yoke 17, which contacts a landing surface. However, the invention described herein is applicable to these types of DMD's, with the yoke 17 being in some cases, equivalent to the mirror for purposes of applying control signals in accordance with the invention. The voltage levels and timing of the control signals are explained below in connection with FIGS. 5 and 6.

Figure 4:
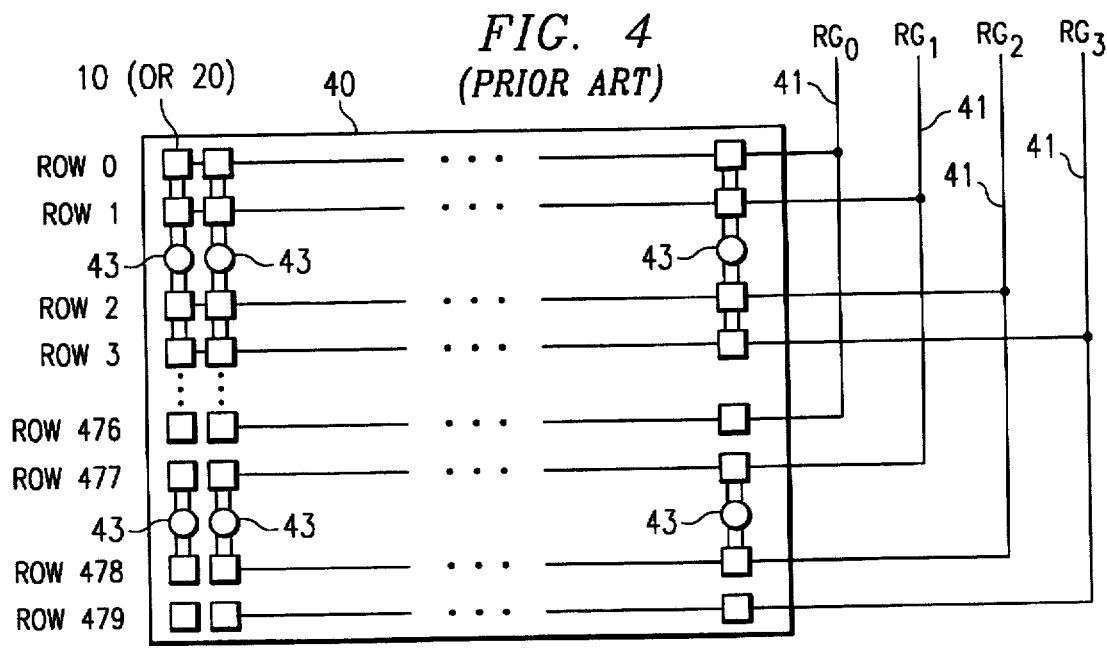
FIG. 4 illustrates a DMD configured for split or divided reset.

FIG. 4 illustrates a portion of a DMD having an array 40 of pixels 10 or 20 configured for split reset addressing. In the example of this description, the reset groups are comprised of rows of pixels, and hence the reset scheme is referred to as "horizontal reset". There are four reset groups, each comprised of one of each consecutive set of four rows. Thus, rows 0, 4, . . . 475 belong to reset group 0; rows 1, 5, . . . 476 belong to reset group 1; rows 2, 6 . . . 478 to reset group 2; and rows 3, 7, . . . 479 to reset group 3. All rows within a reset group are connected to a common reset line 41. This permits each reset group to be separately reset, as an alternative to resetting an entire DMD array at once.

For "split reset" addressing (also referred to as memory multiplexed addressing), every four rows of pixels share a row of memory cells 43. This permits the data for one row to be loaded to the row of memory cells, with that row being reset, while the other rows connected to that row of memory cells are not reset. The split reset configuration reduces the number of memory cells per device, as well as reduces the peak data rates for loading data to the memory cells.

Another configuration that uses reset groups is "divided reset" addressing. For divided reset, each mirror has its own memory cell, but the array is addressed in reset groups to reduce peak data rates.

A feature of the invention is the recognition that pixel control methods that are appropriate for DMDs whose mirrors are reset all at once, may not be appropriate for DMDs whose mirror elements are reset in reset groups. A particular characteristic of split reset DMDs is that when a memory cell is loaded with new data, the stability of all mirrors connected to that memory cell can be affected. In the example of this description, where the address electrodes of four mirrors are connected to a single memory cell, the data on the address electrodes of a mirror changes four times before the position of the mirror changes. This greatly increases the likelihood of the mirror becoming unlatched at the wrong time. Even when the mirror elements do not share a memory cell, such as in divided reset addressing, the switching of neighboring mirror elements might cause a mirror element to become unlatched.

Figure 5:
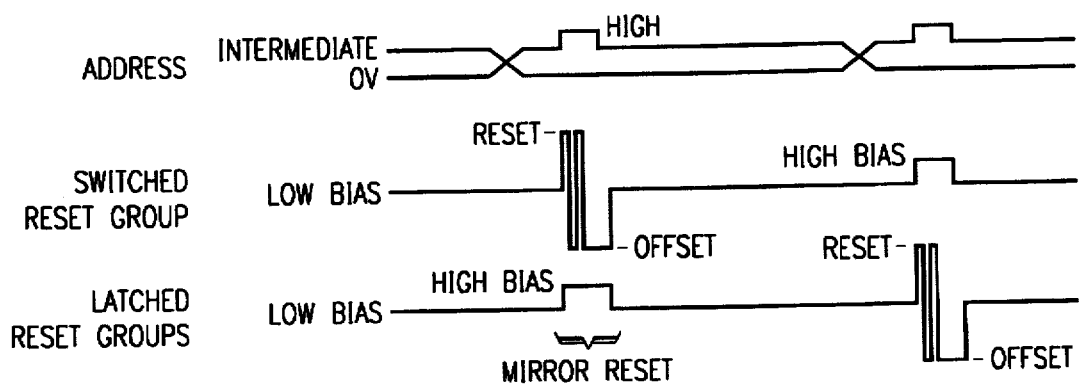
FIG. 5 illustrates the timing of the control voltages of FIG. 3, in accordance with the invention, where the bias voltage is positive.

FIG. 5 illustrates the timing for control voltages of a DMD having reset groups, in accordance with the invention. In FIG. 5, all voltages are positive, including the bias. An example of control voltages with a negative bias is described below in connection with FIG. 6. As explained below, after each address switch, the mirrors are reset to be deflected toward the other address electrode. In other embodiment, the mirror element might have only a single address electrode, in which case the reset would be to a flat position. The same principles would apply to resetting an other type of micro-mechanical device whose moveable elements are to be reset (to a flat or opposing position) in response to at least one address electrode.

The address voltages, $\phi_a$ and $\bar{\phi}_a$, are complementary and remain on or off during the bit period. As explained below, except while mirror elements are being reset, the "on" address electrodes are at an intermediate voltage, which is typically about 4 to 5 volts for CMOS devices. This intermediate address voltage is used during data loading to the memory cells, to decrease possible upset conditions of the mirrors. As a result of new data being loaded to the memory cells, the address voltages any one memory cell may change state. If the DMD is a "split reset" DMD, address voltages for all mirror elements connected to a single memory cell might switch but only one reset group is to be reset.

During the reset period, the address voltage is increased to a "high" address level. This high address voltage is typically about 5 to 8 volts. The resulting increase in the address voltage margin strengthens the electrostatic force toward the "on" address electrode during the repositioning time.

Except during mirror reset, the bias remains at a "low bias" level for all mirrors. A typical low bias level is 20 volts. However, during reset, this low bias voltage is adjusted to aid in resetting those mirrors whose data has been switched and that are to be reset, and to stabilize those mirrors that are not to be reset.

For reset groups that are to be reset, an extra amplitude of voltage is added to the bias to encourage the mirrors to reset. This extra voltage is referred to herein as the "reset signal", and is in the form of one or more pulses. Various waveforms for this pulsed reset signal are described in U.S. patent Ser. No. 08/712,042, entitled "Phase Matched Reset for Digital Micro-Mirror Device", assigned to Texas Instruments Incorporated and incorporated herein by reference. After the reset pulse(s), the bias is reduced to an offset level. Typically, this offset voltage is at or less than the high address voltage. When a mirror rotates to the desired position in response to the address and reset voltages, it remains there until the bias is again pulsed and offset. Where the device is positive, the mirror is reset to the low address electrode.

For reset groups that are not to be reset, the intermediate bias voltage is slightly increased to a "high bias". This increase in the bias for these reset groups occurs during the application of the reset signal and during the removal of the bias for the switched reset group. As a result of the control signals of FIG. 5, mirrors not being reset receive a higher bias voltage when there is an increase in address voltage. This prevents these mirrors from becoming unlatched at the wrong time. Typically, the increase in the intermediate to the high bias is by the same amount as the increase in the address voltage.

As an example of operation of the invention, assume that a memory cell shared by a reset group of mirrors is loaded with new data, causing the address electrodes to switch state. As a result of the address switch, one address electrode is at a low address level of 0 volts and the other is at an intermediate address level of 5 volts. The bias is at 20 volts. For the mirrors that are to be reset, after the address electrodes are switched, the bias is pulsed and offset. This causes the mirror to become unlatched. At the same time, the intermediate address level is increased to 7 volts, which increases the margin between the voltage differences at the two address electrodes from 20−15=5 to 20−13=7. When the bias is reapplied, these mirrors are attracted toward the 0 volt electrode. For the mirrors that are to remain latched, after the address electrodes are switched, the bias is increased to 22 volts so that the voltage difference (22−7=15) between the mirror and the high electrode to which the mirror remains latched, does not fall below 15 volts.

Figure 6:
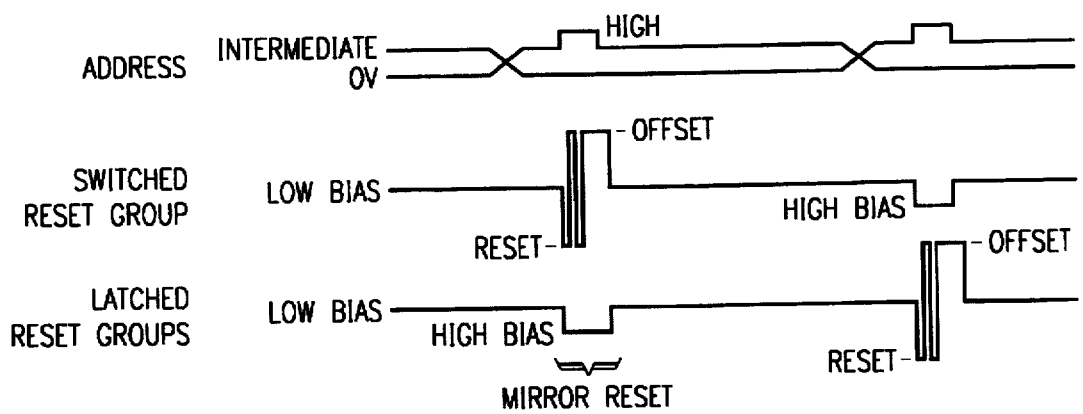
FIG. 6 illustrates the timing of the control voltages of FIG. 3, in accordance with the invention, where the bias voltage is negative.

FIG. 6 illustrates the timing for control voltages of a DMD, which like that of FIG. 5, has reset groups. In FIG. 6, the bias is negative, such that the mirrors are reset toward a high address electrode. The operation is the same, with the increases and decreases to the bias voltage during reset being increases and decreases in magnitude. Thus, where the bias is −20 volts, the offset voltage might be to 7 volts, and the high bias might be to −22 volts.

Although the above description is in terms of a mirror elements having two landing positions and two address electrodes, the same principles could apply to a cantilevered mirror elements with only one address electrode. In general, for a given micro-mechanical structure, there is a minimum voltage difference that can be maintained to keep the moveable element in a latched state. Otherwise, the restoring force of the hinge unaided or aided by any other attractive electrostatic forces can cause the moveable element to become unlatched.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated, that the appended claims will cover all modifications that fall within the true scope of the invention.

What is claimed is:

1. A method of resetting movable elements of a micro-mechanical device, each of said movable elements being attracted toward a landing surface by means of an address voltage, and said moveable elements being grouped into reset groups, comprising the steps of:

applying a bias voltage to said movable elements;

switching each said address voltage of each movable element of one of said reset groups to either a low address level or to an intermediate address level;

after said switching step, resetting said one of said reset groups by adding a reset voltage to said bias voltage and then reducing said bias voltage to an offset bias level;

after said switching step and during said resetting step, increasing said intermediate address level to a high address level; and after said switching step and during said resetting step, increasing said bias voltage to a high bias level, with respect to all other of said reset groups.

2. The method of claim 1, wherein said moveable elements contact said landing surface at a landing site and wherein said bias voltage is also applied to said landing site.

3. The method of claim 1, wherein said bias is positive.

4. The method of claim 1, wherein said bias is negative and wherein said offset bias level is accomplished by reducing the magnitude of said bias voltage and said high bias level is accomplished by increasing the magnitude of said bias voltage.

5. The method of claim 1, wherein said offset bias level is substantially equal to said high address level.

6. The method of claim 1, wherein said each moveable element is reset to an alternative position and wherein said switching step comprises switching complementary address signals.

7. The method of claim 1, wherein said moveable elements are mirror elements of a DMD.

8. The method of claim 7, wherein said mirror elements are hidden hinge mirror elements and wherein said bias voltage is applied to yokes of said mirror elements and wherein said address voltage is applied under said yokes.

9. The method of claim 1, wherein said moveable elements have memory cells that store data representing the state of said address voltage.

10. The method of claim 9, wherein moveable elements of said one of said reset groups share memory cells with moveable elements of other of said reset groups and wherein said switching step is performed for all of said memory cells.

11. A method of resetting mirror elements of a digital micro-mirror device (DMD), each said of mirror elements being attracted toward a landing surface by means of an address voltage, and said mirror elements being grouped into reset groups, comprising the steps of:

applying a bias voltage to said mirror elements;

switching said address voltage of each mirror element of one of said reset groups to either a low address level or to an intermediate address level;

after said switching step, resetting said one of said reset groups by adding a reset voltage to said bias voltage and then reducing said bias voltage to an offset bias level;

after said switching step and during said resetting step, increasing said intermediate address level to a high address level; and after said switching step and during said resetting step, increasing said bias voltage to a high bias level, with respect to all other of said reset groups.

12. The method of claim 11, wherein said mirror elements contact said landing surface at a landing site and wherein said bias voltage is also applied to said landing site.

13. The method of claim 11, wherein said bias is positive.

14. The method of claim 11, wherein said bias is negative and wherein said offset bias level is accomplished by reducing the magnitude of said bias voltage and said high bias level is accomplished by increasing the magnitude of said bias voltage.

15. The method of claim 11 wherein said offset bias level is substantially equal to said high address level.

16. The method of claim 11, wherein said each mirror element is reset to an alternative position and wherein said switching step comprises switching complementary address signals.

17. The method of claim 11, wherein said mirror elements are hidden hinge mirror elements and wherein said bias voltage is applied to yokes of said mirror elements and wherein said address voltage is applied under said yokes.

18. The method of claim 11, wherein said moveable elements have memory cells that store data representing the state of said address voltage.

19. The method of claim 18, wherein moveable elements of said one of said reset groups share memory cells with moveable elements of other of said reset groups and wherein said switching step is performed for all of said memory cells.

* * * * *